Oct. 1, 1935.    F. GELSTHARP ET AL    2,015,791
APPARATUS FOR MAKING FLAT GLASS
Original Filed June 30, 1933   2 Sheets-Sheet 1
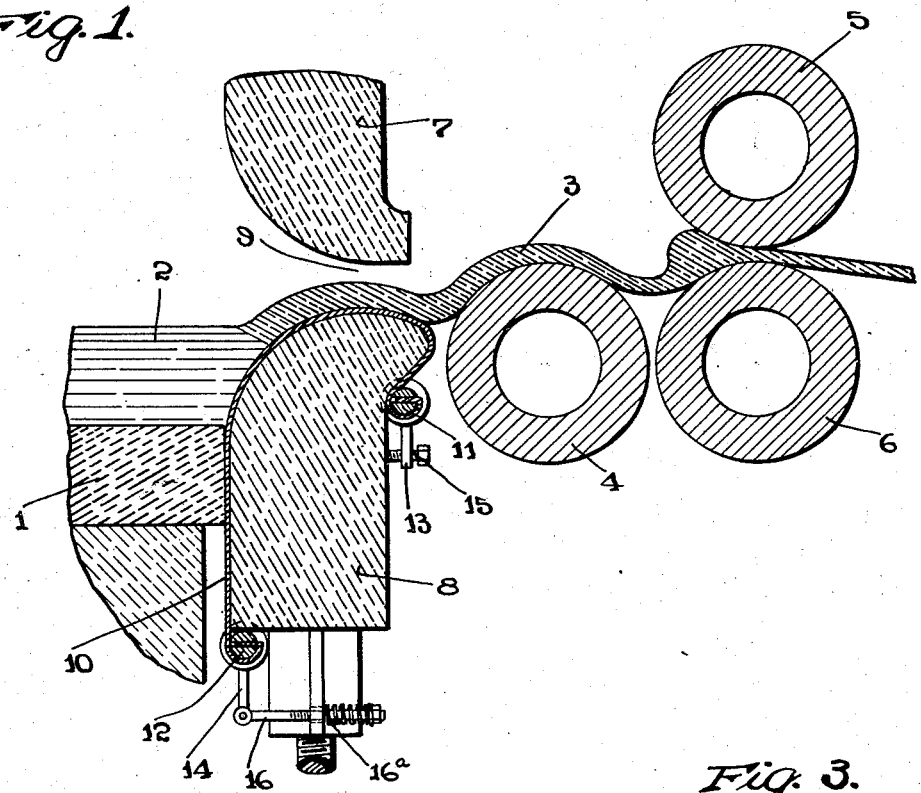
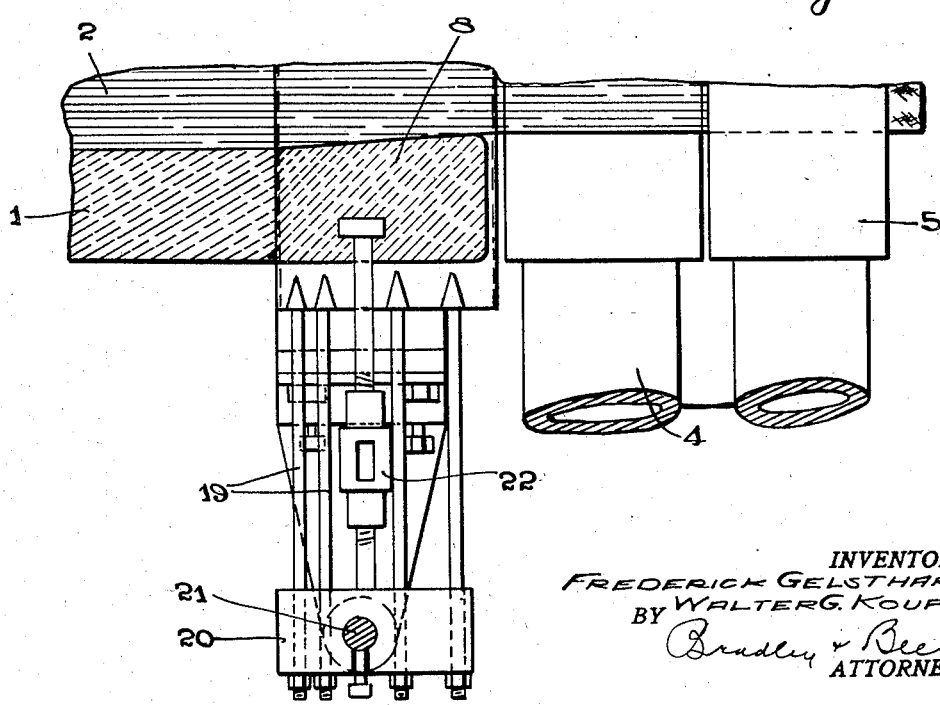
INVENTORS
FREDERICK GELSTHARP AND
BY WALTER G. KOUPAL
Bradley & Bee
ATTORNEYS

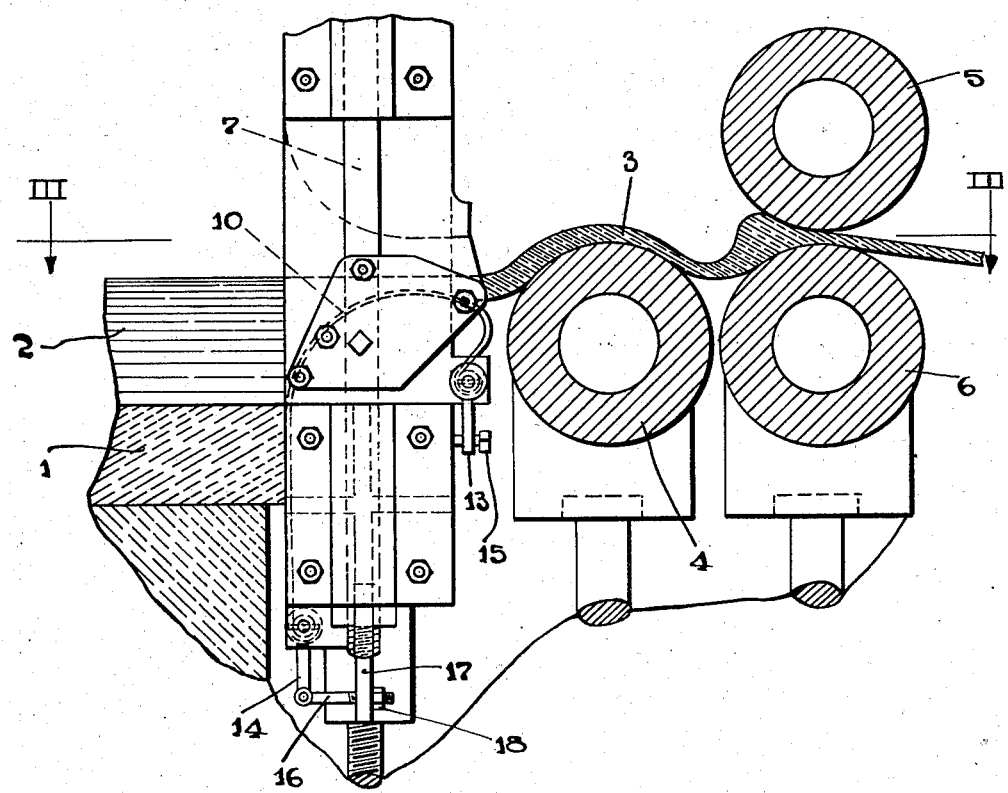

UNITED STATES PATENT OFFICE 2,015,791

APPARATUS FOR MAKING FLAT GLASS

Frederick Gelstharp and Walter G. Koupal, Tarentum, Pa., assignors to Pittsburgh Plate Glass Company, a corporation of Pennsylvania Original application June 30, 1933, Serial No. 678,430. Divided and this application July 7, 1934, Serial No. 734,148

8 Claims. (Cl. 49—33)

The invention relates to apparatus for making plate or sheet glass and constitutes a division of our application Serial No. 678,430, filed June 30, 1933. It has for its objects the provision of improved means for protecting the refractory lip from which the layer of glass to form the sheet is delivered to the supply roll in order to increase the life of the lip and to give a delivery of glass to the roll which is relatively free from bubbles and from other defects due to the reaction of the glass with the lip or to stone coming from the lip. One embodiment of the invention is illustrated in the accompanying drawings, wherein:

Figure 1 is a vertical section through the forward end of a tank embodying the construction. Fig. 2 is a partial side elevation and partial section. And Fig. 3 is a section on the line III—III of Fig. 2.

Referring to the drawings, 1 is the forward end of a draw pot connected to a melting tank as in our application heretofore referred to and carrying a body of molten glass 2 from which the glass sheet 3 is continuously formed. This sheet passes over a driven feed roll 4 between sizing rolls 5 and 6 and through the usual leer. At the forward end of the draw pot is a pair of walls 7 and 8 of clay or other refractory spaced apart to provide the outlet slot 9 through which the sheet passes, such walls being supported and held in position by any suitable means, such as that disclosed in our copending application.

The wall or lip member 8 is provided with a sheath of metal 10 which is resistant to the action of the highly heated glass. The metal best suited is platinum or platinum rhodium composition containing about 10 per cent of rhodium, as these metals are particularly inert to the action of highly heated glass. An outlet wall or lip thus protected will last several times as long as a clay lip which is unprotected, so that loss incident to shut downs and replacements is largely reduced. There is practically no reaction between the metal and the glass, so that the small bubbles which are incorporated into the lower surface of the glass sheet when a lip of clay or other refractory is used, are avoided as well as any small stones which sometimes come from a clay lip. There is further less tendency to trap air into the sheet between the forward edge of the lip and the roll, as is the case with the clay lip, particularly after such clay lip becomes roughened at this point. The metal sheath in opposition to the surface of the roll remains smooth, and little or no air works into the sheet at this point during the rolling operation.

In order to hold the metal sheath smooth under varying temperature conditions, means are provided for tensioning it longitudinally of the lip and also transversely thereof. The transverse tensioning is accomplished by a pair of split rods 11 and 12, between which the edges of the sheet 10 are clamped. These rods are provided at each end with the arms 13 and 14. The arms 13 are swung to rotate the rod 11 by means of the set screws 15, while the arms 14 are swung by the rods 16, thus rotating the rod 12. The rods 16 extend through brackets 17 and their threaded ends carry nuts 18 for moving them endwise. One of the rods 11 and 12 is preferably spring tensioned. As shown, the springs 16a between the nuts and brackets apply constant yielding tension to the sheath holding it smooth under varying temperature conditions.

The sheath is tensioned longitudinally of the wall or lip 8 by the rods 19 (Fig. 3), brazed at their inner ends to the edges of the sheath lying outside the wall of the pot. The outer ends of these rods extend through a bracket 20 carried by the rod 21, and such bracket is adjusted outward by the turnbuckle 22 anchored at its inner end in the side wall of the pot. One of these devices is used at each end of the sheath and their adjustment serves to tighten the sheath along the length of the wall or lid 8.

It is possible by the use of the tensioning equipment, as above described, to satisfactorily protect the clay lip with a very thin sheet of metal since the tension applied in the two directions holds the sheet metal smooth and tight, thus insuring a smooth surface at the top of the lip over which the layer of glass to form the sheet passes. The lower surface of the glass sheet is thus smoother and more free from air bubbles than is the case where an unprotected clay lip is used, and there is no warping of the metal, such as is liable to occur if a solid metal lip is used or one having a relatively thick shell. The platinum rhodium sheath can be used for a long period of time and the clay lip is so protected that it will last indefinitely, so that any shut down incident to the replacement of this part of the apparatus is reduced to a minimum.

What we claim is:

1. Apparatus for making plate glass continuously, comprising a container having an outlet lip of refractory material, a sheath of sheet metal highly resistant to heat and corrosion covering said lip, and means for tensioning said sheath.

2. Apparatus for making plate glass continuously, comprising a container having an outlet lip of refractory material, a sheath of sheet metal highly resistant to heat and corrosion covering said lip, and means for tensioning said sheath longitudinally of the lip.

3. Apparatus for making plate glass continuously, comprising a container having an outlet lip of refractory material, a sheath of sheet metal highly resistant to heat and corrosion covering said lip, and means for tensioning said sheath longitudinally of the lip and also transversely of the lip.

4. Apparatus for making plate glass continuously, comprising a container having an outlet lip of refractory material, a sheath of sheet metal highly resistant to heat and corrosion covering said lip, and means for tensioning said sheath transversely of the lip.

5. Apparatus for making plate glass continuously, comprising a container having an outlet lip of refractory material having a sheet metal sheath of a composition highly resistant to heat and corrosion, anchoring means for the rear edge of the sheet lying between the rear wall of the lip and the bottom wall of the container out of contact with the glass in the tank, and means for anchoring the forward edge of the sheath on the front side of the lip and exterior to the tank.

6. Apparatus for making a plate glass continuously, comprising a container having an outlet lip of refractory material having a sheet metal sheath of a composition highly resistant to heat and corrosion, anchoring means for the rear edge of the sheet lying between the rear wall of the lip and the bottom wall of the container out of contact with the glass in the tank, and means for anchoring the forward edge of the sheath on the front side of the lip and exterior to the tank, one of said anchoring means being adjustable for applying tension to the sheath.

7. Apparatus for making plate glass continuously, comprising a container having an outlet lip of refractory material having a sheet metal sheath of a composition highly resistant to heat and corrosion, and a shaft mounted for rotary adjustment in the wall of the lip to which one edge of the sheath is attached whereby the sheath may be tensioned.

8. Apparatus for making plate glass continuously, comprising a container having an outlet lip of refractory material having a sheet metal sheath of a composition highly resistant to heat and corrosion, a shaft mounted for rotary adjustment to which one end of the sheath is attached, and yielding means arranged to apply force to the shaft to rotate it and tension the sheath.

FREDERICK GELSTHARP.
WALTER G. KOUPAL.